(12) United States Patent
Fung et al.

(10) Patent No.: US 11,108,551 B2
(45) Date of Patent: Aug. 31, 2021

(54) QUANTUM KEY DISTRIBUTION SYSTEM AND METHOD

(71) Applicant: Huawei Technologies Duesseldorf GmbH, Duesseldorf (DE)

(72) Inventors: Fred Chi Hang Fung, Munich (DE); Dawei Wang, Shenzhen (CN)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 47 days.

(21) Appl. No.: 16/576,271

(22) Filed: Sep. 19, 2019

(65) Prior Publication Data
US 2020/0014533 A1    Jan. 9, 2020

Related U.S. Application Data

(63) Continuation of application No. PCT/EP2017/057787, filed on Mar. 31, 2017.

(51) Int. Cl.
| | |
|---|---|
| *H04L 9/08* | (2006.01) |
| *G06N 10/00* | (2019.01) |
| *G06F 17/16* | (2006.01) |
| *H04L 5/00* | (2006.01) |

(52) U.S. Cl.
CPC .......... *H04L 9/0858* (2013.01); *G06F 17/16* (2013.01); *G06N 10/00* (2019.01); *H04L 5/0007* (2013.01)

(58) Field of Classification Search
None
See application file for complete search history.

(56) References Cited

U.S. PATENT DOCUMENTS

| | | | |
|---|---|---|---|
| 2004/0109564 A1* | 6/2004 | Cerf ...................... | H04L 9/0858 380/256 |
| 2020/0389300 A1* | 12/2020 | Wang .................... | H04L 9/0852 |

OTHER PUBLICATIONS

Soh et al., "Self-Referenced Continuous-Variable Quantum Key Distribution Protocol," Physical Review X, pp. 1-15, The American Physical Society (2015).

(Continued)

*Primary Examiner* — William J. Goodchild
(74) *Attorney, Agent, or Firm* — Leydig, Voit & Mayer, Ltd.

(57) ABSTRACT

A continuous variable quantum key distribution system comprises a transmitter and a receiver. The first quantum signal has a first polarization and is associated with first quadrature components and the second quantum signal has a second polarization and is associated with second quadrature components. The receiver receives the quantum signals transmitted by the transmitter via a quantum communication channel; estimates a channel matrix representing the polarization rotation of the first and second polarization caused by the quantum communication channel; modifies the received first and second quantum signals on the basis of the polarization rotation; and uses the modified received first and second quantum signals for generating a secret key. The transmitter may modify the transmitted first quantum signal and the transmitted second quantum signal based on the polarization rotation and use the modified transmitted first quantum signal and the modified transmitted second quantum signal for generating a secret key.

20 Claims, 6 Drawing Sheets

(56) References Cited

OTHER PUBLICATIONS

Gyongyosi et al., "Adaptive Gaussian Quadrature Detection for Continuous-Variable Quantum Key Distribution," Proceedings of SPIE vol. 9762, Advances in Photonics of Quantum Computing, Memory, and Communication IX, pp. 1-16 (2016).
Laudenbach et al., "Continuous-Variable Quantum Key Distribution with Gaussian Modulation—The Theory of Practical Implementations," pp. 1-65, Cornell University (Mar. 27, 2017).
Yuan et al., "Quantum Homodyne Detection Based on Polarization Diversity Technique," Chin. Phys. Lett., vol. 25, No. 6, pp. 1950-1953, Chinese Physical Society and IOP Publishing Ltd. (2008).
Schumacher et al., "Cavity-assisted emission of polarization—entangled photons from biexcitons in quantum dots with fine-structure splitting," XP055787005, vol. 20, No. 5, total 8 pages, Optics Express, OSA (Feb. 2012).
Ota et al.,"Spontaneous two photon emission from a single quantum dot," arxiv.org, Cornell University Library, 201 Olin Library Cornell University Ithaca, NY 14853, XP080513288, total 14 pages (Jul. 2, 2011).
Del Valle et al., "Two-photon lasing by a single quantum dot in a high-Q microcavity," arxiv.org, Cornell University Library, 201 Olin Library Cornell University Ithaca, NY 14853, XP080333664, total 16 pages (Jan. 8, 2010).

\* cited by examiner

QUANTUM KEY DISTRIBUTION SYSTEM AND METHOD

CROSS-REFERENCE TO RELATED APPLICATIONS

This application is a continuation of International Application No. PCT/EP2017/057787, filed on Mar. 31, 2017, the disclosure of which is hereby incorporated by reference in its entirety.

TECHNICAL FIELD

Generally, embodiments of the present disclosure relates to the field of quantum key distribution. More specifically, the embodiments of present disclosure relates to a continuous variable quantum key distribution (CV QKD) system and method.

BACKGROUND

Quantum key distribution (QKD) uses quantum carriers (also referred to as quantum signals), typically single-photon or strongly attenuated light pulses, for sharing a secret electronic key. Typically, a sequence of such light pulses, i.e. quantum signals, is transmitted from a transmitter (often referred to as "Alice") via a quantum channel to a receiver (often referred to as "Bob"), wherein each light pulse encodes a key bit. The quantum properties of light, in particular the Heisenberg uncertainty principle, ensure that no information can be gained on these key bits without disturbing the quantum state of the photons. Public communications over an additional classical channel are then used to estimate the maximum amount of information that a potential eavesdropper may have acquired, and to distil a secret key out of the raw data.

Several practical schemes for quantum key distribution have been proposed and implemented in the past, including discrete-variable and continuous-variable (CV) QKD are employed to distribute secret keys. CV QKD systems make use of continuous quantum variable, such as the electric field amplitudes, to obtain possibly more efficient alternatives to conventional photon-counting QKD techniques. From a practical point of view, the CV approach has potential advantages because it is compatible with the standard optical telecommunication technologies. It is foreseeable that this approach will become a viable candidate for large-scale secure quantum communications.

FIG. 1 shows a schematic diagram of a conventional CV QKD system 100 comprising a transmitter 110 and a receiver 120. Only one polarization is used in the CV QKD system 100 to carry the quantum signal from the transmitter 110 to the receiver 120. The channel introduces a polarization change and the polarization of the received signal can be adjusted by the receiver 120 to match that of the subsequent detection. The polarization adjustment can be made, for instance, on the basis of co-propagating stronger training signals.

FIG. 2 shows a schematic diagram of a conventional CV QKD system 200 comprising a transmitter 210 and a receiver 220 based on a polarization diversity technique for quantum detection (Yuan Yu, Gui-Hua Zeng, and Zhi Yi, "Quantum Homodyne Detection Based on Polarization Diversity Technique", Chin. Phys. Lett., 25(6):1950-1953 (2008)). In the CV QKD system 200 both the vertical and horizontal polarizations are detected separately in order to recover the original signal transmitted in only one polarization. Because only one polarization is transmitted, a simple combination of the detected signals in the two polarizations suffices to recover the original signal.

To support more than one QKD channel, conventional CV QKD systems use different wavelengths or different fibers to transmit the quantum signals separately.

Thus, there is still a need for an improved continuous variable quantum key distribution system as well as a method of operating such a system.

SUMMARY

It is an object to provide an improved continuous variable quantum key distribution system as well as a method of operating such a system.

The foregoing and other objects are achieved by the subject matter of the independent claims. Further implementation forms are apparent from the dependent claims, the description and the figures.

Embodiments of the invention are based on the general idea to allow two different CV QKD signals (also referred to as "quantum signals" herein) to be transmitted simultaneously on the same wavelength and same fiber using two different polarizations. Thus, embodiments of the invention make better use of the available degree of freedoms than conventional CV QKD systems.

More specifically, embodiments of the invention are based on the idea to use both the horizontal and vertical polarizations to encode independent quantum signals. Both signals can be used to form a quantum key using QKD. The transmitter can transmit the two polarizations encoded with quantum information in a quantum coherent state of light. The signal in each polarization can be encoded in the amplitude and phase values of the coherent state (or equivalently encoded in the X and P quadratures). At the receiver the two polarizations can be separated and the quantum signal of each polarization is obtained. Since the channel has introduced a polarization change to the signals, the polarization change in the signals can be removed before they are passed on for further standard CV QKD processing steps to generate the secret quantum key. Standard CV QKD processing steps can include the following major steps: parameter estimation, error reconciliation, and privacy amplification. In embodiments of the invention the meaning of the transmitted quantum signals is re-interpreted after their reception at the receiver in order to undo the polarization change induced by the channel, as will be described in more detail further below. The quantum signals can be used for key generation.

More specifically, a first aspect relates to a continuous variable quantum key distribution system, comprising: a transmitter or transmitting device configured to modulate and to transmit a plurality of quantum signals, including a first quantum signal and a second quantum signal, wherein the first quantum signal has a first polarization and is associated with first quadrature components $X_H$ and $P_H$ and the second quantum signal has a second polarization dual to the first polarization and is associated with second quadrature components $X_v$ and $P_v$; and a receiver or receiving device configured to receive the plurality of quantum signals transmitted by the transmitter via a quantum communication channel, wherein the receiver is further configured to estimate a channel matrix C representing the polarization rotation of the first and second polarization caused by the quantum communication channel; wherein the receiver is configured to modify the received first quantum signal and the received second quantum signal on the basis of the polarization rotation and to use the modified received first quantum signal and the modified received second quantum signal for generating a secret key, and/or wherein the transmitter is configured to modify the transmitted first quantum signal and the transmitted second quantum signal on the basis of the polarization rotation and to use the modified transmitted first quantum signal and the modified transmitted second quantum signal for generating a secret key. In an implementation form, the first quantum signal having the first polarization and the second quantum signal having the second polarization each define a quantum coherent state of light.

Thus, an improved system for continuous variable quantum key distribution is provided. As light has inherently both a vertical and a horizontal polarization, which are orthogonal, the CV QKD system according to the first aspect makes better use of the available communication resources by making use of both the polarizations to carry independent quantum information. Doing so greatly enhances the efficiency of the communication resources, as embodiments of the invention are capacity achieving.

In a first possible implementation form of the system according to the first aspect as such, the channel matrix C is defined by the following equation:

$$\begin{bmatrix} X'_H + iP'_H \\ X'_V + iP'_V \end{bmatrix} = C \begin{bmatrix} X_H + iP_H \\ X_V + iP_V \end{bmatrix} + \begin{bmatrix} n_1 \\ n_2 \end{bmatrix}$$

wherein $X'_H$ and $P'_H$ denote first quadrature components associated with the received first quantum signal, $X'_V$ and $P'_V$ denote second quadrature components associated with the received second quantum signal, i denotes the imaginary unit and $n_1$, $n_2$ denote noise terms.

In a second possible implementation form of the system according to the first aspect as such or the first implementation form thereof, the receiver is configured to determine on the basis of the channel matrix C the inverse channel matrix $C^{-1}$ and to apply the inverse channel matrix $C^{-1}$ to the received first quantum signal and the received second quantum signal for modifying the first received quantum signal and the second received quantum signal on the basis of the polarization rotation.

In a third possible implementation form of the system according to the first aspect as such or the first implementation form thereof, the receiver is configured to feed the channel matrix C back to the transmitter and wherein the transmitter is configured to apply the channel matrix C to the transmitted first quantum signal and the transmitted second quantum signal for modifying the transmitted first quantum signal and the transmitted second quantum signal on the basis of the polarization rotation.

In a fourth possible implementation form of the system according to the first aspect as such or the first implementation form thereof, the receiver is configured to determine a singular value decomposition of the channel matrix $C=USV^\dagger$, wherein U and $V^\dagger$ denote unitary matrices and S denotes a diagonal matrix with singular values as diagonal elements, and to feed the unitary matrix $V^\dagger$ back to the transmitter; wherein the transmitter is configured to apply the unitary matrix $V^\dagger$ to the transmitted first quantum signal and the transmitted second quantum signal for modifying the transmitted first quantum signal and the transmitted second quantum signal on the basis of the polarization rotation; and wherein the receiver is further configured to apply the inverse of the product of the unitary matrix U and the diagonal matrix S, i.e. $(US)^{-1}$, to the received first quantum signal and the received second quantum signal for modifying the first received quantum signal and the second received quantum signal on the basis of the polarization rotation.

In a fifth possible implementation form of the system according to the first aspect as such or any one of the first to fourth implementation form thereof, the plurality of quantum signals comprise at least one training signal and wherein the receiver is configured to estimate the polarization rotation of the first and second polarization caused by the quantum communication channel on the basis of the at least one training signal.

In a sixth possible implementation form of the system according to the first aspect as such or any one of the first to fifth implementation form thereof, the system further comprises a classical communication channel for exchanging information between the transmitter and the receiver.

In a seventh possible implementation form of the system according to the first aspect as such or any one of the first to sixth implementation form thereof, the receiver comprises a polarization beam splitter for splitting the received first quantum signal and the received second quantum signal.

In an eighth possible implementation form of the system according to the first aspect as such or any one of the first to seventh implementation form thereof, the receiver is configured to modulate the plurality of quantum signals on the basis of a Gaussian modulation scheme.

In a ninth possible implementation form of the system according to the first aspect as such or any one of the first to seventh implementation form thereof, the receiver is configured to modulate the plurality of quantum signals on the basis of a discrete modulation scheme, in particular a Quadrature Phase-Shift Keying (QPSK) modulation scheme.

A second aspect relates to a method of operating a continuous variable quantum key distribution system, the method comprising the steps of: modulating and transmitting a plurality of quantum signals, including a first quantum signal and a second quantum signal, wherein the first quantum signal has a first polarization and is associated with first quadrature components $X_H$ and $P_H$ and the second quantum signal has a second polarization dual to the first polarization and is associated with second quadrature components $X_V$ and $P_V$; and receiving the plurality of quantum signals via a quantum communication channel and estimating a channel matrix C representing the polarization rotation of the first and second polarization caused by the quantum communication channel; wherein the method comprises the further steps of: modifying the received first quantum signal and the received second quantum signal on the basis of the polarization rotation and using the modified received first quantum signal and the modified received second quantum signal for generating a secret key, and/or modifying the transmitted first quantum signal and the transmitted second quantum signal on the basis of the polarization rotation and using the modified transmitted first quantum signal and the modified transmitted second quantum signal for generating a secret key. In an implementation form, the first quantum signal having the first polarization and the second quantum signal having the second polarization each define a quantum coherent state of light.

Thus, an improved method of operating a continuous variable quantum key distribution system is provided.

In an implementation form the channel matrix C is defined by the following equation:

$$\begin{bmatrix} X'_H + iP'_H \\ X'_V + iP'_V \end{bmatrix} = C \begin{bmatrix} X_H + iP_H \\ X_V + iP_V \end{bmatrix} + \begin{bmatrix} n_1 \\ n_2 \end{bmatrix}$$

wherein $X'_H$ and $P'_H$ denote first quadrature components associated with the received first quantum signal, $X'_V$ and $P'_V$ denote second quadrature components associated with the received second quantum signal, i denotes the imaginary unit and $n_1$, $n_2$ denote noise terms.

In a first possible implementation form of the method according to the second aspect as such, the method comprises the further steps of: determining on the basis of the channel matrix C the inverse channel matrix $C^{-1}$; and applying the inverse channel matrix $C^{-1}$ to the received first quantum signal and the received second quantum signal for modifying the first received quantum signal and the second received quantum signal on the basis of the polarization rotation.

In a second possible implementation form of the method according to the second aspect as such, the method comprises the further steps of: feeding the channel matrix C back to a transmitter; and applying at the transmitter the channel matrix C to the transmitted first quantum signal and the transmitted second quantum signal for modifying the transmitted first quantum signal and the transmitted second quantum signal on the basis of the polarization rotation.

In a third possible implementation form of the method according to the second aspect as such, the method comprises the further steps of: determining a singular value decomposition of the channel matrix $C=USV^\dagger$, wherein U and $V^\dagger$ denote unitary matrices and S denotes a diagonal matrix with singular values as diagonal elements; feeding the unitary matrix $V^\dagger$ back to a transmitter; apply at the transmitter the unitary matrix $V^\dagger$ to the transmitted first quantum signal and the transmitted second quantum signal for modifying the transmitted first quantum signal and the transmitted second quantum signal on the basis of the polarization rotation; and applying the inverse of the product of the unitary matrix U and the diagonal matrix S, i.e. $(US)^{-1}$, to the received first quantum signal and the received second quantum signal for modifying the first received quantum signal and the second received quantum signal on the basis of the polarization rotation.

A third aspect relates to a computer program comprising program code for performing the method according to the second aspect when executed on a computer.

A fourth aspect relates to a transmitting device for use in a continuous variable quantum key distribution system. The transmitting device is configured to modulate and transmit, over a quantum communication channel, to a receiving device a plurality of quantum signals, including a first quantum signal and a second quantum signal, wherein the first quantum signal has a first polarization and is associated with first quadrature components $X_H$ and $P_H$ and the second quantum signal has a second polarization and is associated with second quadrature components $X_V$ and $P_V$. The transmitting device receives over a classical communication channel a channel matrix or a unitary part of a singular value decomposition of the channel matrix from the receiving device, the channel matrix C representing a polarization rotation of the first and second polarization caused by the quantum communication channel. The transmitting device further modifies the transmitted first quantum signal and the transmitted second quantum signal on the basis of the polarization rotation and to use the modified transmitted first quantum signal and the modified transmitted second quantum signal for generating a secret key.

In an implementation of the fourth aspect, the singular value decomposition of the channel matrix $C=USV^\dagger$, wherein U and $V^\dagger$ denote unitary matrices and S denotes a diagonal matrix with singular values as diagonal elements, and the unitary part of the singular value decomposition of the channel matrix is $V^\dagger$.

Although not described explicitly, features relating to the transmitter described in the implementation forms of the system according to the first aspect may also be implemented alone or in combination in further implementations of the transmitting device of the fifth aspect.

According to a fifth aspect, a receiving device for use in a continuous variable quantum key distribution system. The transmitting device is configured to receive a plurality of quantum signals transmitted by a transmitter via a quantum communication channel, wherein the first quantum signal has a first polarization and is associated with first quadrature components $X_H$ and $P_H$ and the second quantum signal has a second polarization and is associated with second quadrature components $X_V$ and $P_V$. The receiving device estimates a channel matrix C representing the polarization rotation of the first and second polarization caused by the quantum communication channel and determines a singular value decomposition of the channel matrix. The receiving device is configured to modify the received first quantum signal and the received second quantum signal on the basis of the polarization rotation by applying a part of the singular value decomposition of the channel matrix and to use the modified received first quantum signal and the modified received second quantum signal for generating a secret key.

In an implementation of the fifth aspect, the singular value decomposition of the channel matrix $C=USV^\dagger$, wherein U and $V^\dagger$ denote unitary matrices and S denotes a diagonal matrix with singular values as diagonal elements. The part of the singular value decomposition of the channel matrix applied to the received first quantum signal and the received second quantum signal is given by the product of the unitary matrix U and the diagonal matrix S.

Although not described explicitly, features relating to the receiver described in the implementation forms of the system according to the first aspect may also be implemented alone or in combination in further implementations of the receiving device of the fifth aspect.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which embodiments of the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
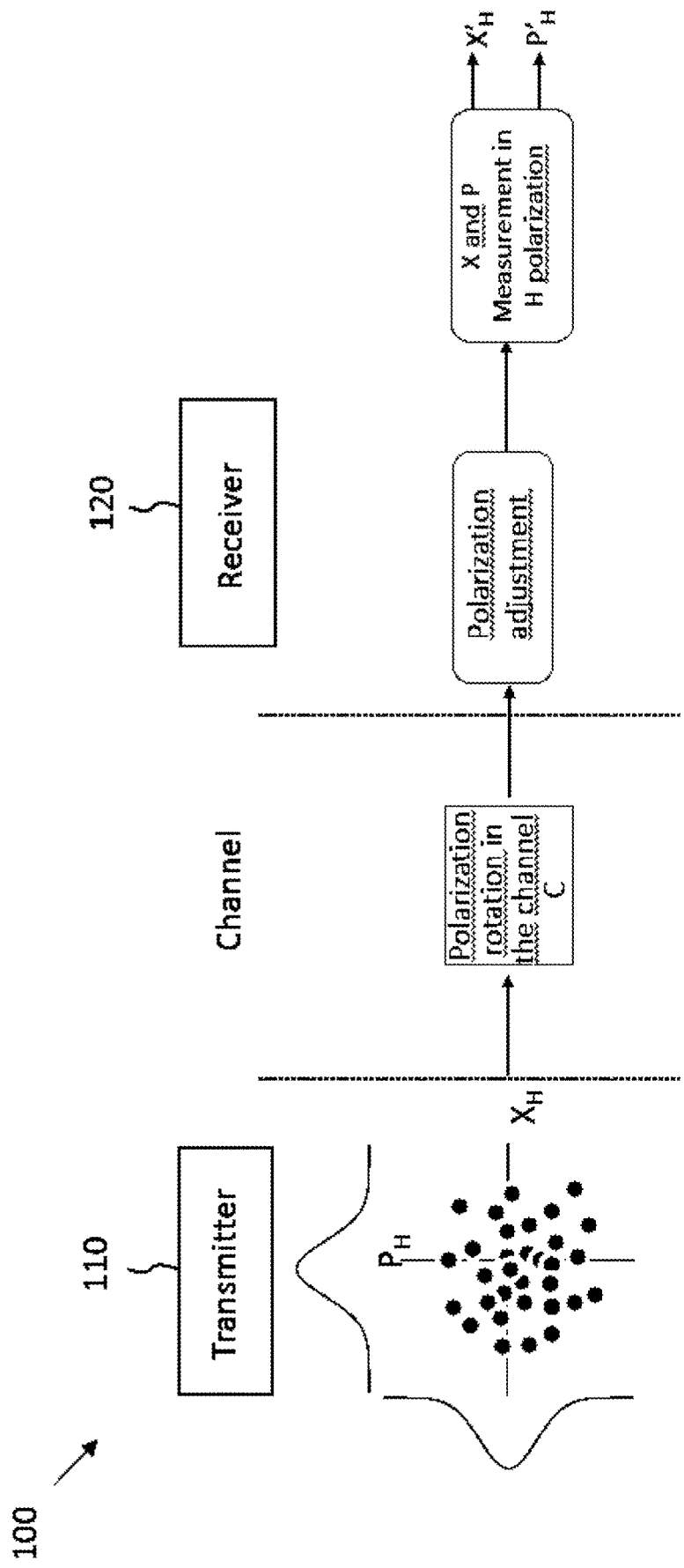
FIG. 1 shows a schematic diagram illustrating a conventional single-polarization CV QKD system.
Figure 2:
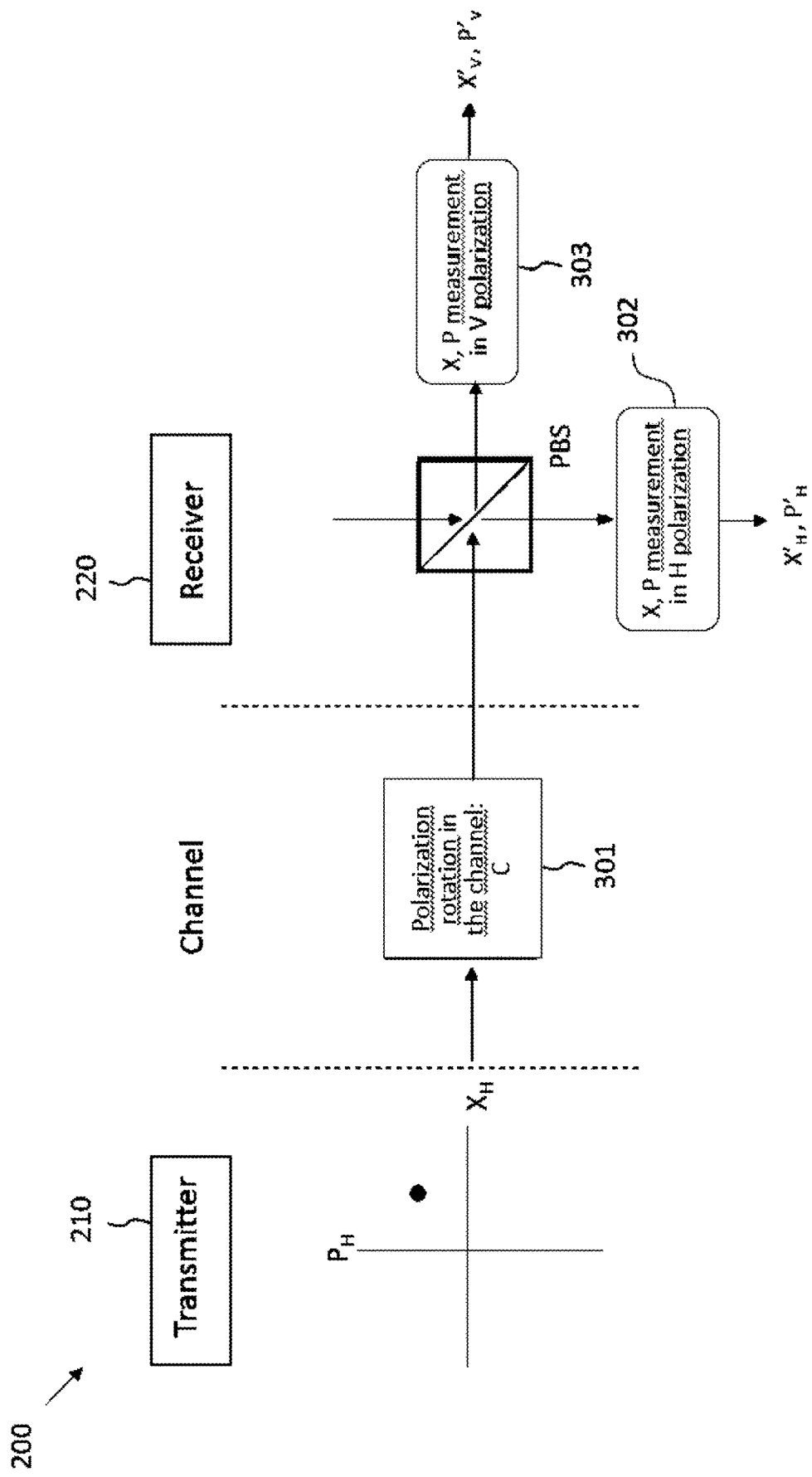
FIG. 2 shows a schematic diagram illustrating a conventional CV QKD system based on a polarization diversity technique for quantum detection.
Figure 3:
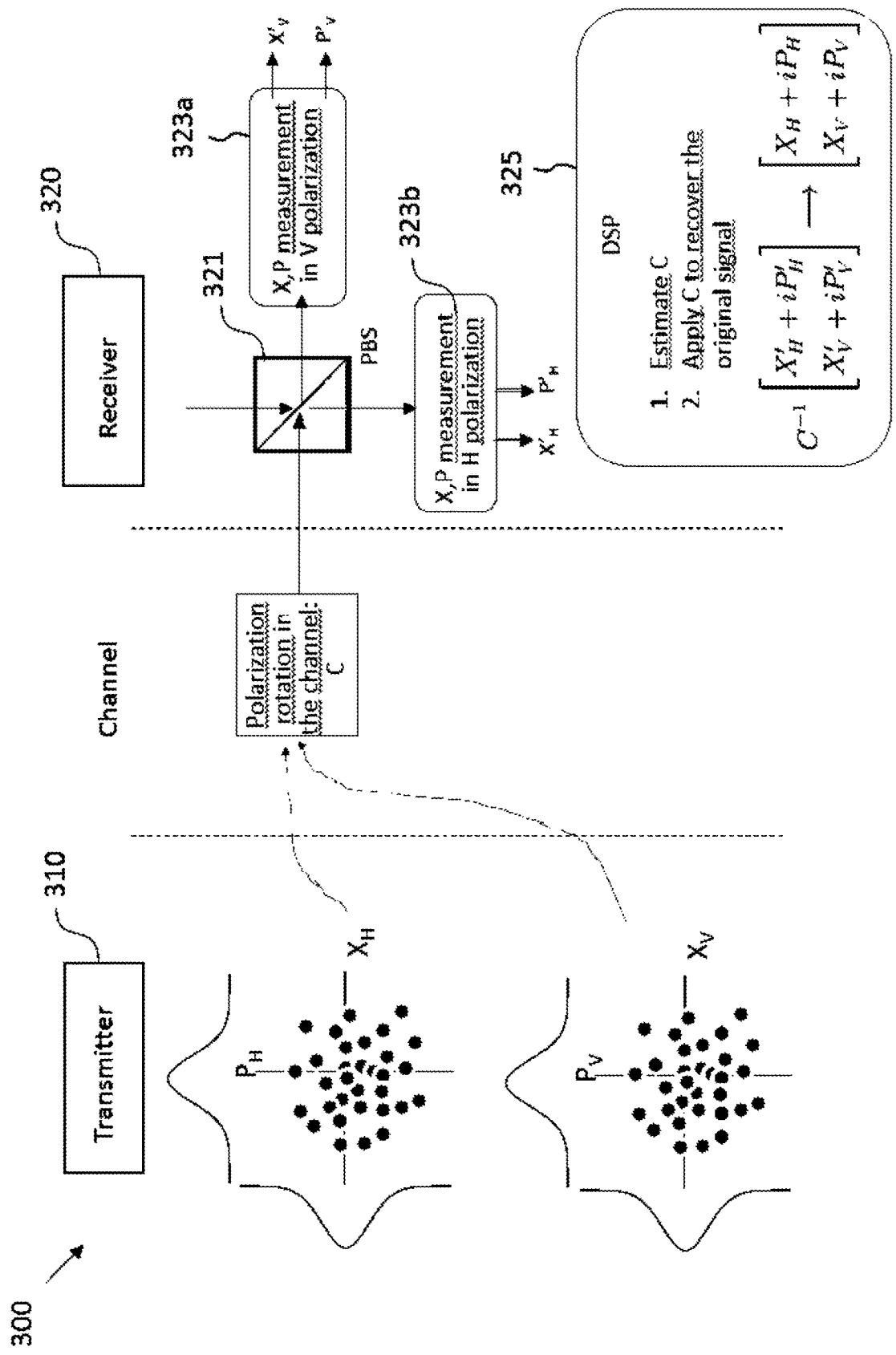
FIG. 3 shows a schematic diagram illustrating a CV QKD system according to an embodiment of the invention.

FIG. 3 shows a schematic diagram illustrating a CV QKD system 300 according to an embodiment of the invention, comprising a transmitter or transmitting device 310 and a receiver or receiving device 320.

The transmitter 310 is configured to modulate and to transmit a plurality of quantum signals, including a first quantum signal and a second quantum signal, wherein the first quantum signal has a first polarization and is associated with first quadrature components $X_H$ and $P_H$ and the second quantum signal has a second polarization dual to the first polarization and is associated with second quadrature components $X_v$ and $P_v$. In an embodiment, the first quantum signal having the first polarization and the second quantum signal having the second polarization each define a quantum coherent state of light. As will be appreciated, however, non-coherent states, e.g. noisy states, are possible as well.

The receiver 320 is configured to receive the plurality of quantum signals transmitted by the transmitter 310 via a quantum communication channel, wherein the receiver 320 is further configured to estimate a channel matrix C (also referred to as channel rotation matrix C) representing the polarization rotation of the first and second polarization caused by the quantum communication channel.

In an embodiment, the receiver 320 is further configured to modify the received first quantum signal and the received second quantum signal on the basis of the polarization rotation and to use the modified received first quantum signal and the modified received second quantum signal for generating a secret key.

Alternatively or additionally, the transmitter 310 is configured to modify the transmitted first quantum signal and the transmitted second quantum signal on the basis of the polarization rotation and to use the modified transmitted first quantum signal and the modified transmitted second quantum signal for generating a secret key.

In the embodiment shown in FIG. 3, the quantum signal is encoded at the transmitter 310 on the vertical and horizontal polarizations. In an embodiment, the quantum signals can be chosen randomly according to a Gaussian modulation or other discrete modulation schemes such as QPSK. In the embodiment shown in FIG. 3, the receiver 320 comprises a beam splitter 321 for splitting the incoming signals into the vertical and horizontal polarizations. Moreover, the receiver 320 can comprise a first detector 323a and a second detector 323b for performing a homodyne measurement or a heterodyne measurement in order to obtain the X and P quadrature values for each polarization. The channel matrix C can be estimated by the receiver 230 (for instance by a processor 325 of the receiver 320) using a pilot tone or a training sequence. For example, a pilot tone, which is a strong signal, may be transmitted by the transmitter 310 at a frequency different from the frequency from which the polarization change is inferred. In another embodiment, a training sequence can be used, where some quantum signals are designated for estimating the channel matrix C. The training sequence may be formed from a fixed sequence of quantum signals initially agreed by both the transmitter 310 and the receiver 320 or from random quantum signals designated by the transmitter 310 after the transmission. After the channel matrix C has been estimated, the receiver 320 can apply the reverse rotation to the received data to recover the original signal in the original two polarizations from the transmitter's perspective. In other words, in a first embodiment the receiver is configured to determine on the basis of the channel matrix C the inverse channel matrix $C^{-1}$ and to apply the inverse channel matrix $C^{-1}$ to the received first quantum signal and the received second quantum signal for modifying the first received quantum signal and the second received quantum signal on the basis of the polarization rotation.

In an embodiment, the channel matrix C is defined by the following equation:

$$\begin{bmatrix} X'_H + iP'_H \\ X'_V + iP'_V \end{bmatrix} = C \begin{bmatrix} X_H + iP_H \\ X_V + iP_V \end{bmatrix} + \begin{bmatrix} n_1 \\ n_2 \end{bmatrix}$$

wherein $X'_H$ and $P'_H$ denote first quadrature components associated with the received first quantum signal, $X'_v$ and $P'_v$ denote second quadrature components associated with the received second quantum signal, i denotes the imaginary unit and $n_1$, $n_2$ denote noise terms.

It turns out that, in general, the quantum channel leads to some correlations between the received signals of the two polarizations.

A the receiver, the received signal is processed to compensate channel polarization rotation by applying the inverse channel matrix:

$$C^{-1} \cdot \begin{bmatrix} X'_H + iP'_H \\ X'_V + iP'_V \end{bmatrix} =$$

$$C^{-1}\left(C \cdot \begin{bmatrix} X_H + iP_H \\ X_V + iP_V \end{bmatrix} + \begin{bmatrix} n_1 \\ n_2 \end{bmatrix}\right) = \begin{bmatrix} X_H + iP_H \\ X_V + iP_V \end{bmatrix} + C^{-1}\begin{bmatrix} n_1 \\ n_2 \end{bmatrix}.$$

This leads to mixing of the channel noises $n_1$ and $n_2$ of the two polarizations. In the equations above, the unprimed signals are used by the transmitter for further QKD processing, while the left hand term represents the signals used by the receiver for further QKD processing.

The two further embodiments described in the following provide a de-correlation of the received signals of the two polarizations and, therefore, achieve improved communication efficiency.

In a second embodiment, the adjustment for the polarization is performed at the transmitter 310. By re-interpreting the source signal at the transmitter 310, the receiver's polarization frame instead of the transmitter's polarization frame can be regarded as the reference frame. Also in this second embodiment the channel rotation can be estimated using a pilot tone or training sequence, but the receiver 320 does not apply the correction to the received signals. Instead, the receiver 320 transfers this channel rotation information (preferably over a classical communication channel, which is generally present in a QKD system) to the transmitter 310 and the transmitter 310 in turn applies the rotation to the quantum signals that have been transmitted by the transmitter 310. The transmitted signal is known exactly, i.e. without polarization-dependent or channel impairments, at the transmitter 310. Consequently, the transmitter can reconstruct the signal received at the receiver 320 by applying the channel matrix, wherein the channel matrix takes into account the channel polarization rotation, and the effective reconstructed signals is not corrupted by the polarization dependent impairments.

In other words, in the second embodiment the receiver 320 is configured to feed the channel matrix C back to the transmitter 310, wherein the transmitter 310 is configured to apply the channel matrix C to the transmitted first quantum signal and the transmitted second quantum signal for modifying the transmitted first quantum signal and the transmitted second quantum signal on the basis of the polarization rotation.

The second embodiment is conceptually equivalent to the situation where the transmitter 310 transmits the rotated signal over a communication channel that does not induce any rotation. In this equivalent scenario at the receiver 320, the two polarizations are not mixed by the channel and each of them is effectively detected directly.

It can be shown mathematically that for the second embodiment the signals for further QKD post-processing are only disturbed by independent (i.e. de-correlated) additive noise terms.

As an example, the channel transformation of the transmitted quantum signal may be:

$$\begin{bmatrix} X'_H + iP'_H \\ X'_V + iP'_V \end{bmatrix} = C \cdot \begin{bmatrix} X_H + iP_H \\ X_V + iP_V \end{bmatrix} + \begin{bmatrix} n_1 \\ n_2 \end{bmatrix}$$

If the channel rotation was applied at the receiver, the recovered transmitted signal would be:

$$C^{-1} \cdot \begin{bmatrix} X'_H + iP'_H \\ X'_V + iP'_V \end{bmatrix} =$$

$$C^{-1} \left( C \cdot \begin{bmatrix} X_H + iP_H \\ X_V + iP_V \end{bmatrix} + \begin{bmatrix} n_1 \\ n_2 \end{bmatrix} \right) = \begin{bmatrix} X_H + iP_H \\ X_V + iP_V \end{bmatrix} + C^{-1} \begin{bmatrix} n_1 \\ n_2 \end{bmatrix}$$

In this case the signal recovery process at the receiver would mix the channel noises $n_1$ and $n_2$ of the two polarizations (last term on the right hand side of the previous equation).

In the present disclosure the channel matrix is applied at the transmitter instead of the receiver. Specifically, the channel matrix received from the receiving device 320 is applied by the transmitter to the transmitted quantum signal.

In this manner, the transmitting device can cancel out the channel polarization rotation as if they were transmitted over an identity channel:

$$\begin{bmatrix} X'_H + iP'_H \\ X'_V + iP'_V \end{bmatrix} = C \cdot \begin{bmatrix} X_H + iP_H \\ X_V + iP_V \end{bmatrix} + \begin{bmatrix} n_1 \\ n_2 \end{bmatrix},$$

where the left hand side of the equation represent the quantum signal received at the receiving device 320 and the first term of the right hand side represents the quantum signal reconstructed at the transmitting device 310:

$$\begin{bmatrix} X''_H + iP''_H \\ X''_V + iP''_V \end{bmatrix} = C \cdot \begin{bmatrix} X_H + iP_H \\ X_V + iP_V \end{bmatrix}.$$

The quantum signals at the transmitter and at the receiver will differ by additive independent noise without any correlation due to channel impairment. In the above equations, the double primed signals are used by the transmitter for further QKD processing, while the primed signals are used by the receiver for further QKD processing.

Thus, the transmitter 310 can be regarded to have transmitted signals which undergo no channel rotation, so that the channel communication capacity can be achieved.

The third embodiment is based on the idea that a portion of the adjustment for the polarization change also happens at the transmitter 310. However, unlike in the second embodiment the adjustment of the polarization change according to the third embodiment is only a partial channel at the transmitter 310. The inverse of the remaining part of the channel happens at the receiver 320. The third embodiment will be described in the following under further reference to FIG. 4.

In the third embodiment both the transmitter 310 and the receiver 320 perform channel adjustments so that overall the effect of the entire channel matrix C is compensated. In comparison to the second embodiment, the third embodiment has the further advantage that the new signals, which are regarded to have been transmitted by the transmitter 310, are also Gaussian distributed (assuming the original signals are Gaussian distributed, which is the case of Gaussian modulated CV-QKD). Thus the transmission statistics are not changed by such a re-interpretation. Embodiments of the invention are based on the assumption that contrary to conventional communication systems, in general, QKD uses random signals. This allows to post rotate the transmitted signals to form different random signals and regard them to have been transmitted instead. Since the signals are randomly distributed anyway, a rotation at the transmitter side of the transmitted signals will not affect the quantum key generation process. The new rotated signals can thus be used for further post-processing.

Figure 5:
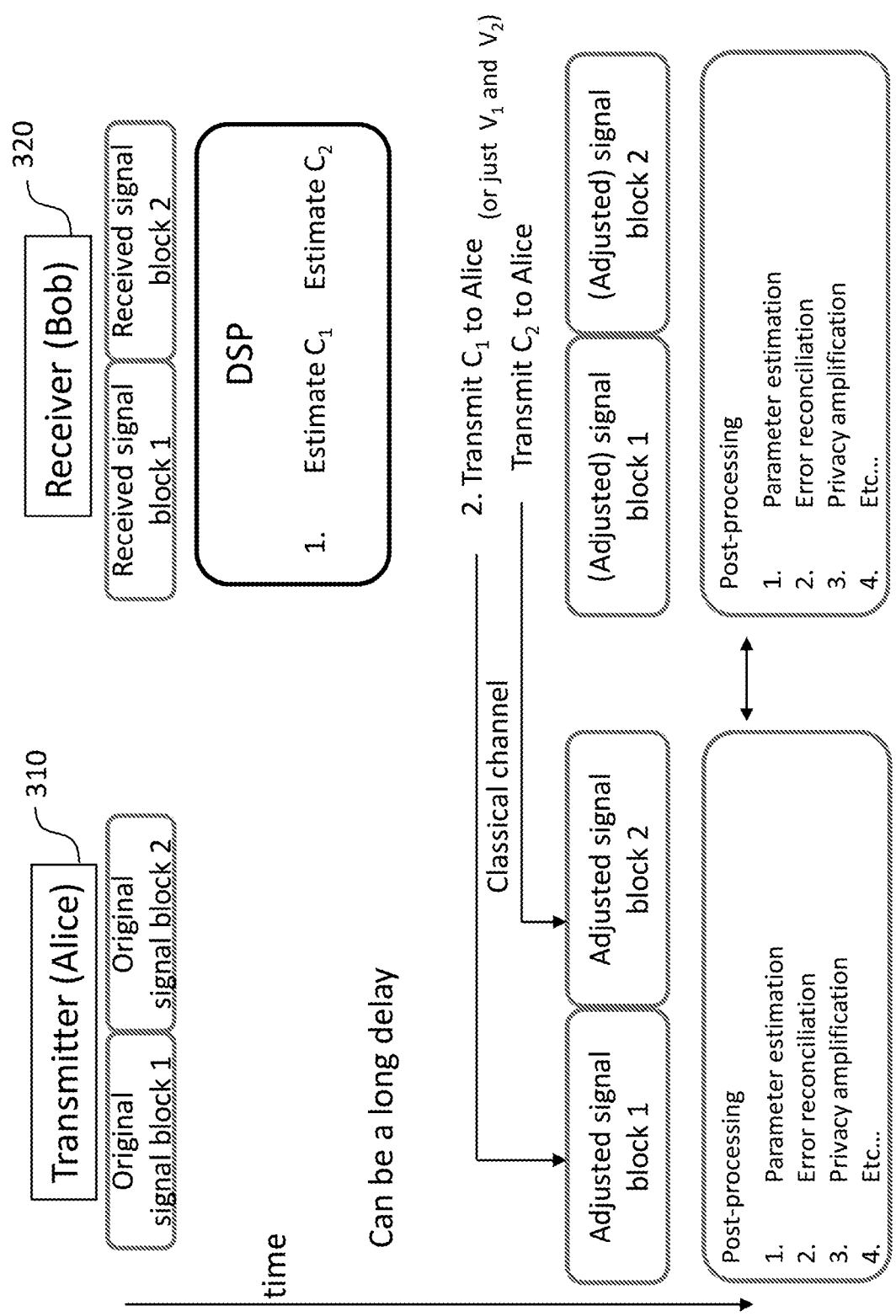
FIG. 5 shows a schematic diagram illustrating an interaction between a transmitter and a receiver of a CV QKD system according to an embodiment of the invention.

As illustrated in FIG. 5, the third embodiment can make use of a singular value decomposition of the channel matrix C. More specifically, according to the third embodiment the receiver 320 (for instance, by means of the processor 325) can be configured to determine a singular value decomposition of the channel matrix $C=USV^\dagger$, wherein U and $V^\dagger$ denote unitary matrices and S denotes a diagonal matrix with singular values as diagonal elements, and to feed the unitary matrix $V^\dagger$ back to the transmitter 310.

The transmitter 310 is configured to apply the unitary matrix $V^\dagger$ to the transmitted first quantum signal and the transmitted second quantum signal for modifying the transmitted first quantum signal and the transmitted second quantum signal on the basis of the polarization rotation:

$$\begin{bmatrix} X''_H + iP''_H \\ X''_V + iP''_V \end{bmatrix} = V^\dagger \begin{bmatrix} X_H + iP_H \\ X_V + iP_V \end{bmatrix}.$$

The left hand side represents quantum signals as if they were transmitted to the receiver over the following channel:

$$\begin{bmatrix} X'_H + iP'_H \\ X'_V + iP'_V \end{bmatrix} = US \begin{bmatrix} X''_H + iP''_H \\ X''_V + iP''_V \end{bmatrix} + \begin{bmatrix} n_1 \\ n_2 \end{bmatrix},$$

where the left hand side represents the transmitted quantum signals as received at the receiver side.

The receiver 320 is further configured to apply the inverse of the product of the unitary matrix U and the diagonal matrix S, i.e. $(US)^{-1}$, to the received first quantum signal and the received second quantum signal for modifying the first received quantum signal and the second received quantum signal on the basis of the polarization rotation.

It can be shown mathematically that also for the third embodiment (as in the case of the second embodiment) the signals for further QKD post-processing are only disturbed by independent (i.e. de-correlated) additive noise terms, so that also the third embodiment allows achieving the channel communication capacity.

As an example after receiving the unitary matrix $V^\dagger$ from the receiver, the transmitter can generate the following new signals:

$$\begin{bmatrix} X''_H + iP''_H \\ X''_V + iP''_V \end{bmatrix} = V^\dagger \begin{bmatrix} X_H + iP_H \\ X_V + iP_V \end{bmatrix}.$$

The left hand side gives a representation of the signal as if they were transmitted to the receiver over the following channel:

$$\begin{bmatrix} X'_H + iP'_H \\ X'_V + iP'_V \end{bmatrix} = US \begin{bmatrix} X''_H + iP''_H \\ X''_V + iP''_V \end{bmatrix} + \begin{bmatrix} n_1 \\ n_2 \end{bmatrix}.$$

The receiver can now apply the channel correction to the received signals:

$$(US)^{-1} \begin{bmatrix} X'_H + iP'_H \\ X'_V + iP'_V \end{bmatrix} = \begin{bmatrix} X''_H + iP''_H \\ X''_V + iP''_V \end{bmatrix} + (US)^{-1} \begin{bmatrix} n_1 \\ n_2 \end{bmatrix}.$$

The equation above gives:

$$\begin{bmatrix} X'''_H + iP'''_H \\ X'''_V + iP'''_V \end{bmatrix} = \begin{bmatrix} X''_H + iP''_H \\ X''_V + iP''_V \end{bmatrix} + \begin{bmatrix} v_1^{-1} \tilde{n}_1 \\ v_2^{-1} \tilde{n}_2 \end{bmatrix}.$$

Therefore, the signals received at the receiver after applying the channel correction will be equal, up to an additive independent noise factor to the signals at the transmitter after application of the correction $V^\dagger$. For independent noises it is meant that the single elements of the noise factor are not cross correlated through the channel matrix. In the above equations, the double primed signals are used by the transmitter for further QKD processing, while the triple primed are used by the receiver for further QKD processing.

FIG. 5 schematically illustrates the logical framework for the adjustment of the signals of the transmitter 310 for the first and second embodiment described above. For the illustrative example shown in FIG. 5 it is assumed that the polarization change is constant for one signal block. In the digital signal processing (DSP) block (implemented, for instance, in the processor 325 of the receiver 320) the polarization rotation of the channel is estimated using a suitable method, such as using a pilot tone or a training sequence scheme, as generally known from telecommunications. Thereafter, the receiver 320 (i.e. Bob) transmits the polarization rotation information for each signal block to the transmitter 310 (i.e. Alice), which then adjusts the signals to be transmitted on the basis of this information. In one of the embodiments described above, the receiver 320 (i.e. Bob) adjusts its received signals as well. Finally, the adjusted, i.e. rotated signals of the transmitter 310 and the signals of the receiver 320 are passed on to further QKD post-processing steps, which can follow standard QKD procedures, such as parameter estimation, error reconciliation, privacy amplification and the like.

Figure 4:
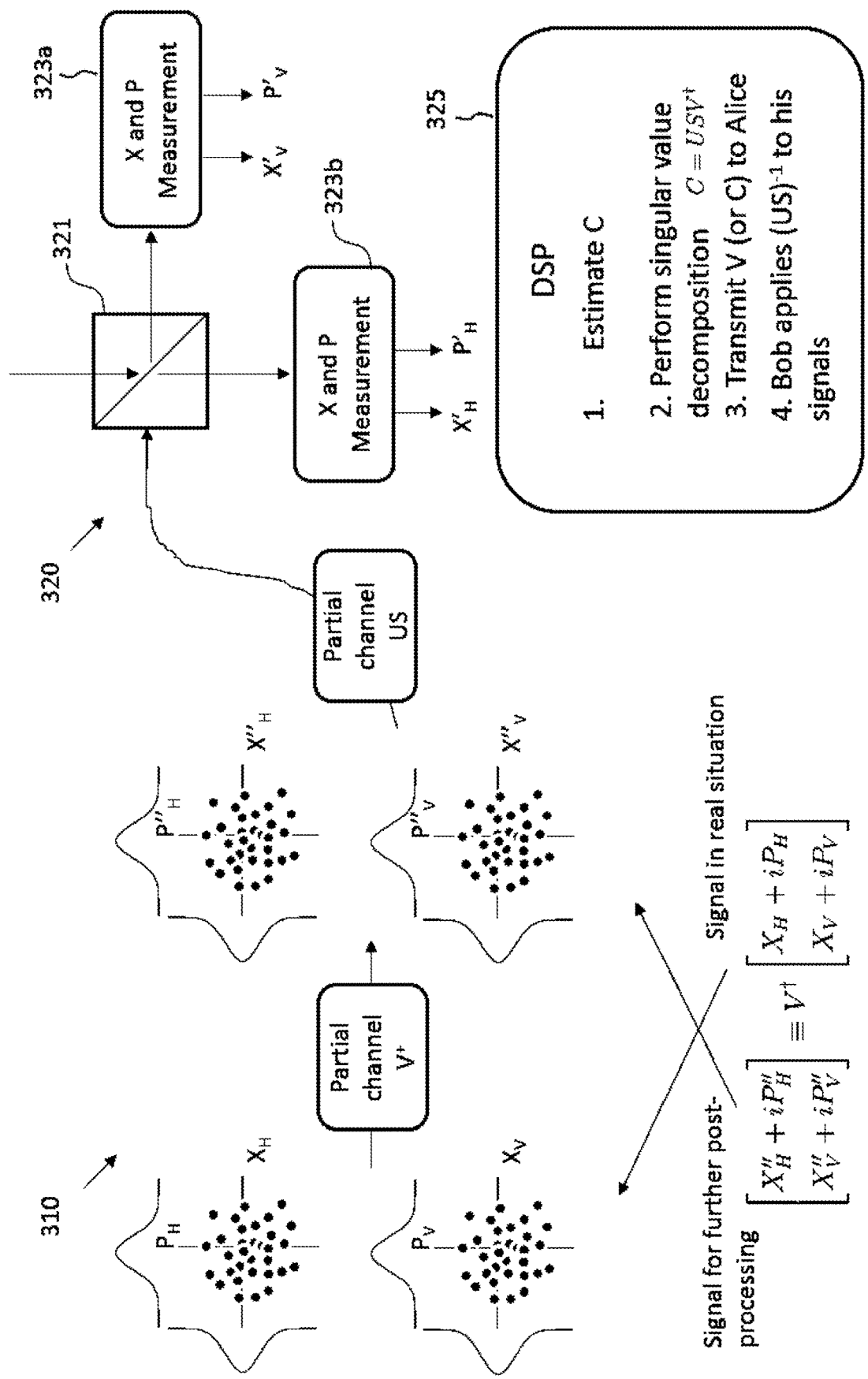
FIG. 4 shows a schematic diagram illustrating different aspects of a CV QKD system according to an embodiment of the invention.

As will be appreciated, other channel compensation or channel recovery operations may be added to the system 300 as necessary, which have been omitted in FIG. 4 for the sake of clarity. As will be appreciated, the adjustment at the transmitter 310 can be done at any time, after the corresponding signal has been received by the receiver 320. In other words, in the CV QKD system 300 there is no real-time requirement.

As will be appreciated, the signal's characteristics for the third embodiment are not changed when Gaussian modulation is used for CV-QKD. According to this modulation scheme, the signal for each polarization is generated on the X-P plane by independently sampling a zero-mean Gaussian distribution with the same variance to obtain the X and P values. Thus, the signal distribution is Gaussian on the X-P plane and is invariant to any unitary rotation. The resultant signals in the two polarizations are also independently distributed. Thus, the rotation adjustment does not change Alice's signals' characteristics. On the other hand, for the second embodiment (or the third embodiment employing a discrete modulation scheme, such as QPSK), the signals' characteristics are not preserved. However, in this case embodiments of the invention still can be used together with a suitable security analysis and post-processing.

Figure 6:
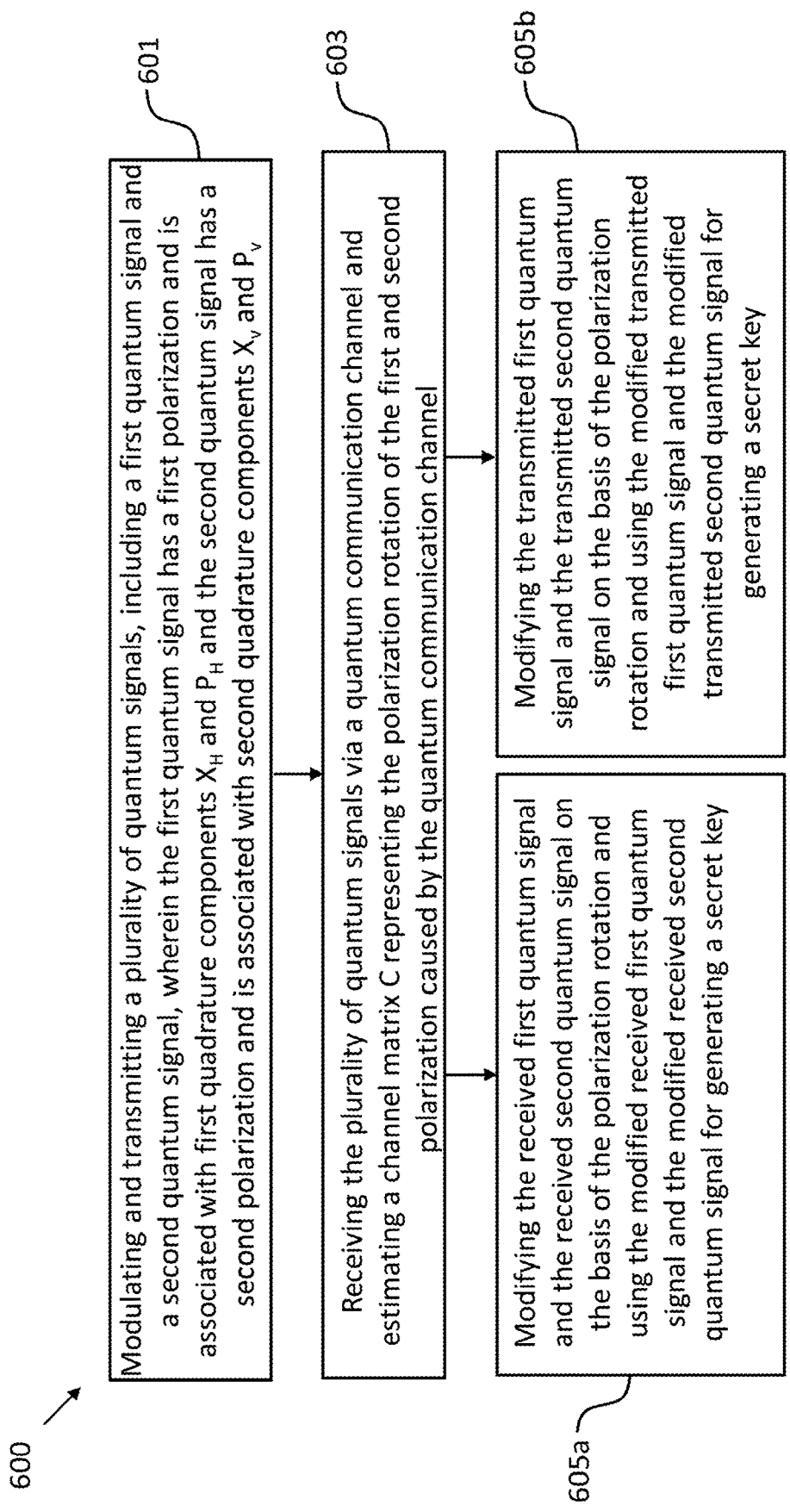
FIG. 6 shows a schematic diagram illustrating a method of operating a CV QKD system according to an embodiment of the invention.

FIG. 6 shows a schematic diagram illustrating a method 600 of operating the CV QKD system 300 according to an embodiment of the invention. The method 600 comprises the steps of: modulating and transmitting 601 a plurality of quantum signals, including a first quantum signal and a second quantum signal, wherein the first quantum signal has a first polarization and is associated with first quadrature components $X_H$ and $P_H$ and the second quantum signal has a second polarization and is associated with second quadrature components $X_V$ and $P_V$; and receiving 603 the plurality of quantum signals via a quantum communication channel and estimating a channel matrix C representing the polarization rotation of the first and second polarization caused by the quantum communication channel.

The method 600 comprises the further steps of: modifying 605a the received first quantum signal and the received second quantum signal on the basis of the polarization rotation and using the modified received first quantum signal and the modified received second quantum signal for generating a secret key, and/or modifying 605b the transmitted first quantum signal and the transmitted second quantum signal on the basis of the polarization rotation and using the modified transmitted first quantum signal and the modified transmitted second quantum signal for generating a secret key.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A continuous variable quantum key distribution system, comprising:
    a transmitter configured to modulate and to transmit a plurality of quantum signals, including a first quantum signal and a second quantum signal transmitted on a same wavelength and on a same fiber, wherein the first quantum signal has a first polarization and is associated with first quadrature components $X_H$ and $P_H$ and the second quantum signal has a second polarization and is associated with second quadrature components $X_v$ and $P_v$; and
    a receiver configured to receive the plurality of quantum signals transmitted by the transmitter via a quantum communication channel, wherein the receiver is further configured to estimate a channel matrix C representing a polarization rotation of the first and second polarization caused by the quantum communication channel,
    wherein the receiver is configured to modify the received first quantum signal and the received second quantum signal on the basis of the polarization rotation and to use the modified received first quantum signal and the modified received second quantum signal for generating a secret key, and/or
    wherein the transmitter is configured to modify the transmitted first quantum signal and the transmitted second quantum signal on the basis of the polarization rotation and to use the modified transmitted first quantum signal and the modified transmitted second quantum signal for generating a secret key and to transmit the first quantum signal and the second quantum signal simultaneously, wherein the first polarization is orthogonal to the second polarization.

2. The system of claim 1, wherein the channel matrix C is defined by the following equation:

$$\begin{bmatrix} X'_H + iP'_H \\ X'_V + iP'_V \end{bmatrix} = C \begin{bmatrix} X_H + iP_H \\ X_V + iP_V \end{bmatrix} + \begin{bmatrix} n_1 \\ n_2 \end{bmatrix}$$

wherein $X'_H$ and $P'_H$ denote first quadrature components associated with the received first quantum signal, $X'_V$ and $P'_V$ denote second quadrature components associated with the received second quantum signal, i denotes the imaginary unit and $n_1$, $n_2$ denote noise terms.

3. The system of claim 1, wherein the receiver is configured to determine on the basis of the channel matrix C the inverse channel matrix $C^{-1}$ and to apply the inverse channel matrix $C^{-1}$ to the received first quantum signal and the received second quantum signal for modifying the first received quantum signal and the second received quantum signal on the basis of the polarization rotation.

4. The system of claim 1, wherein the receiver is configured to feed the channel matrix C back to the transmitter and wherein the transmitter is configured to apply the channel matrix C to the transmitted first quantum signal and the transmitted second quantum signal for modifying the transmitted first quantum signal and the transmitted second quantum signal on the basis of the polarization rotation.

5. The system of claim 1,
    wherein the receiver is configured to determine a singular value decomposition of the channel matrix $C=USV^\dagger$, wherein U and $V^\dagger$ denote unitary matrices and S denotes a diagonal matrix with singular values as diagonal elements, and to feed the unitary matrix $V^\dagger$ back to the transmitter;
    wherein the transmitter is configured to apply the unitary matrix $V^\dagger$ to the transmitted first quantum signal and the transmitted second quantum signal for modifying the transmitted first quantum signal and the transmitted second quantum signal on the basis of the polarization rotation; and
    wherein the receiver is further configured to apply the inverse of the product of the unitary matrix U and the diagonal matrix S to the received first quantum signal and the received second quantum signal for modifying the first received quantum signal and the second received quantum signal on the basis of the polarization rotation.

6. The system of claim 1, wherein the plurality of quantum signals comprise at least one training signal and wherein the receiver is configured to estimate the polarization rotation of the first and second polarization caused by the quantum communication channel on the basis of the at least one training signal.

7. The system of claim 1, wherein the system further comprises a classical communication channel for exchanging information between the transmitter and the receiver.

8. The system of claim 1, wherein the receiver comprises a polarization beam splitter for splitting the received first quantum signal and the received second quantum signal.

9. The system of claim 1, wherein the transmitter is configured to modulate the plurality of quantum signals on the basis of a Gaussian modulation scheme.

10. The system of claim 1, wherein the transmitter is configured to modulate the plurality of quantum signals on the basis of a discrete modulation scheme, in particular a Quadrature Phase Shift Keying (QPSK) modulation scheme.

11. A transmitting device for use in a continuous variable quantum key distribution system, the transmitting device being configured to:
modulate and transmit over a quantum communication channel to a receiving device a plurality of quantum signals, including a first quantum signal and a second quantum signal transmitted on a same wavelength and on a same fiber, wherein the first quantum signal has a first polarization and is associated with first quadrature components $X_H$ and $P_H$ and the second quantum signal has a second polarization and is associated with second quadrature components $X_V$ and $P_V$; and
receive over a classical communication channel C a channel matrix or a unitary part of a singular value decomposition of the channel matrix from the receiving device, the channel matrix representing a polarization rotation of the first and second polarization caused by the quantum communication channel;
wherein the transmitting device is further configured to modify the transmitted first quantum signal and the transmitted second quantum signal on the basis of the polarization rotation and to use the modified transmitted first quantum signal and the modified transmitted second quantum signal for generating a secret key and to transmit the first quantum signal and the second quantum signal simultaneously, wherein the first polarization is orthogonal to the second polarization.

12. The transmitting device of claim 11, wherein the channel matrix C is defined by the following equation:

$$\begin{bmatrix} X'_H + iP'_H \\ X'_V + iP'_V \end{bmatrix} = C \begin{bmatrix} X_H + iP_H \\ X_V + iP_V \end{bmatrix} + \begin{bmatrix} n_1 \\ n_2 \end{bmatrix}$$

wherein $X'_H$ and $P'_H$ denote first quadrature components associated with the received first quantum signal, $X'_V$ and $P'_V$ denote second quadrature components associated with the received second quantum signal, i denotes the imaginary unit and $n_1$, $n_2$ denote noise terms.

13. The transmitting device of claim 11, wherein the first quantum signal and the second quantum signal each define a coherent state of light.

14. A receiving device for use in a continuous variable quantum key distribution system, the receiving device being configured to:
receive a plurality of quantum signals transmitted by a transmitter via a quantum communication channel, wherein the first quantum signal has a first polarization and is associated with first quadrature components $X_H$ and $P_H$ and the second quantum signal has a second polarization and is associated with second quadrature components $X_V$ and $P_V$, and wherein the first quantum signal and the second quantum signal are received on a same wavelength and on a same fiber; and
estimate a channel matrix C representing a polarization rotation of the first and second polarization caused by the quantum communication channel and determine a singular value decomposition of the channel matrix;
wherein the receiver is configured to modify the received first quantum signal and the received second quantum signal on the basis of the polarization rotation by applying a part of the singular value decomposition of the channel matrix and to use the modified received first quantum signal and the modified received second quantum signal for generating a secret key and to receive the first quantum signal and the second quantum signal simultaneously, wherein the first polarization is orthogonal to the second polarization.

15. The receiving device of claim 14, wherein the channel matrix C is defined by the following equation:

$$\begin{bmatrix} X'_H + iP'_H \\ X'_V + iP'_V \end{bmatrix} = C \begin{bmatrix} X_H + iP_H \\ X_V + iP_V \end{bmatrix} + \begin{bmatrix} n_1 \\ n_2 \end{bmatrix}$$

wherein $X'_H$ and $P'_H$ denote first quadrature components associated with the received first quantum signal, $X'_V$ and $P'_V$ denote second quadrature components associated with the received second quantum signal, i denotes the imaginary unit and $n_1$, $n_2$ denote noise terms.

16. The receiving device of claim 14, further comprising a beam splitter configured to split the plurality of quantum signals into vertical and horizontal polarizations.

17. A method of operating a continuous variable quantum key distribution system, comprising:
modulating and transmitting, by a transmitting device, a plurality of quantum signals, including a first quantum signal and a second quantum signal transmitted on a same wavelength and on a same fiber, wherein the first quantum signal has a first polarization and is associated with first quadrature components $X_H$ and $P_H$ and the second quantum signal has a second polarization and is associated with second quadrature components $X_V$ and $P_V$;
receiving, by a receiving device, the plurality of quantum signals via a quantum communication channel and estimating a channel matrix C representing a polarization rotation of the first and second polarization caused by the quantum communication channel; and
implementing at least one of:
modifying the received first quantum signal and the received second quantum signal on the basis of the polarization rotation and using the modified received first quantum signal and the modified received second quantum signal for generating a secret key, and/or
modifying the transmitted first quantum signal and the transmitted second quantum signal on the basis of the polarization rotation and using the modified transmitted first quantum signal and the modified transmitted second quantum signal for generating a secret key and to transmit the first quantum signal and the second quantum signal simultaneously, wherein the first polarization is orthogonal to the second polarization.

18. The method of claim 17, further comprising:
determining on the basis of the channel matrix C the inverse channel matrix $C^{-1}$; and
applying the inverse channel matrix $C^{-1}$ to the received first quantum signal and the received second quantum signal for modifying the first received quantum signal and the second received quantum signal on the basis of the polarization rotation.

19. The method of claim 17, further comprising:
feeding the channel matrix C back to a transmitter; and
applying at the transmitter the channel matrix C to the transmitted first quantum signal and the transmitted second quantum signal for modifying the transmitted first quantum signal and the transmitted second quantum signal on the basis of the polarization rotation.

20. The method of claim 17, further comprising:
determining a singular value decomposition of the channel matrix $C=USV^\dagger$, wherein U and $V^\dagger$ denote unitary matrices and S denotes a diagonal matrix with singular values as diagonal elements;
feeding the unitary matrix $V^\dagger$ back to a transmitter;
apply at the transmitter the unitary matrix $V^\dagger$ to the transmitted first quantum signal and the transmitted second quantum signal for modifying the transmitted first quantum signal and the transmitted second quantum signal on the basis of the polarization rotation; and
applying the inverse of the product of the unitary matrix U and the diagonal matrix S to the received first quantum signal and the received second quantum signal for modifying the first received quantum signal and the second received quantum signal on the basis of the polarization rotation.

* * * * *